United States Patent
Chai et al.

(10) Patent No.: US 10,984,214 B2
(45) Date of Patent: Apr. 20, 2021

(54) METHOD AND DEVICE FOR UNLOCKING FINGERPRINT

(71) Applicants: BOE Technology Group Co., Ltd., Beijing (CN); CHENGDU BOE OPTOELECTRONICS TECHNOLOGY CO., LTD., Sichuan (CN)

(72) Inventors: Yuanyuan Chai, Beijing (CN); Yangpeng Wang, Beijing (CN); Weinan Dai, Beijing (CN); Yao Hu, Beijing (CN); Yingsong Xu, Beijing (CN)

(73) Assignees: BOE TECHNOLOGY GROUP CO., LTD., Beijing (CN); CHENGDU BOE OPTOELECTRONICS TECHNOLOGY CO., LTD., Sichuan (CN)

( * ) Notice: Subject to any disclaimer, the term of this patent is extended or adjusted under 35 U.S.C. 154(b) by 63 days.

(21) Appl. No.: 16/197,602

(22) Filed: Nov. 21, 2018

(65) Prior Publication Data

US 2019/0228202 A1    Jul. 25, 2019

(30) Foreign Application Priority Data

Jan. 19, 2018 (CN) .......................... 201810053649.8

(51) Int. Cl.
*G06K 9/00* (2006.01)
*G09G 3/22* (2006.01)
*H05B 47/11* (2020.01)

(52) U.S. Cl.
CPC .............. *G06K 9/0004* (2013.01); *G09G 3/22* (2013.01); *H05B 47/11* (2020.01); *G06K 2009/0006* (2013.01); *G09G 2360/144* (2013.01)

(58) Field of Classification Search
CPC ......... G06K 9/0004; G06K 2009/0006; G06K 9/00–0012; H05B 47/11; G09G 3/22;
(Continued)

(56) References Cited

U.S. PATENT DOCUMENTS

2006/0238517 A1* 10/2006 King .................... G06F 1/1626
345/173
2007/0192821 A1*  8/2007 Suga .................... H04N 21/485
725/139

(Continued)

FOREIGN PATENT DOCUMENTS

CN         106302977 A     1/2017
CN         106716431 A     5/2017
(Continued)

OTHER PUBLICATIONS

Office Action dated Sep. 2, 2019 issued in corresponding Chinese Application No. 201810053649.8.
(Continued)

*Primary Examiner* — Roberto W Flores
(74) *Attorney, Agent, or Firm* — Nath, Goldberg & Meyer; Joshua B. Goldberg

(57) ABSTRACT

A method and a device for unlocking a fingerprint are provided. The method includes: controlling a predetermined light-emitting region of a display device to enter a first display mode upon receipt of external light, controlling the predetermined light-emitting region of the display device to enter a second display mode when the predetermined light-emitting region of the display device is pressed; and acquiring fingerprint information in the predetermined light-emitting region of the display device after the predetermined light-emitting region enters the second display mode, and determining whether to allow unlocking or not according to the fingerprint information.

10 Claims, 4 Drawing Sheets

(58) Field of Classification Search
CPC ............... G09G 2360/114; G06F 21/32; G06F 3/041–047
See application file for complete search history.

(56) References Cited

U.S. PATENT DOCUMENTS

| | | | |
|---|---|---|---|
| 2008/0111886 A1* | 5/2008 | Bai | H04N 5/144 |
| | | | 348/173 |
| 2015/0324569 A1* | 11/2015 | Hong | G06F 21/32 |
| | | | 345/174 |
| 2017/0084216 A1* | 3/2017 | Hsiao | G09G 3/20 |
| 2018/0012563 A1* | 1/2018 | Lee | G09G 5/10 |
| 2018/0218195 A1* | 8/2018 | Sheik-Nainar | G06K 9/00355 |
| 2018/0224955 A1* | 8/2018 | Chen | G06F 3/03547 |
| 2018/0277065 A1 | 9/2018 | Zuo et al. | |
| 2018/0285619 A1* | 10/2018 | Kim | G09G 3/3266 |
| 2019/0019048 A1 | 1/2019 | Deng et al. | |
| 2019/0102594 A1* | 4/2019 | Peng | G06K 9/0004 |
| 2019/0120472 A1* | 4/2019 | Zhu | G06K 9/0004 |
| 2019/0130155 A1* | 5/2019 | Park | G06K 9/0004 |
| 2019/0362129 A1* | 11/2019 | Sandhan | G06K 9/00 |
| 2020/0026371 A1* | 1/2020 | Baek | H04W 12/00508 |

FOREIGN PATENT DOCUMENTS

| | | |
|---|---|---|
| CN | 106850988 A | 6/2017 |
| CN | 106940589 A | 7/2017 |
| CN | 107017996 A | 8/2017 |
| CN | 107111763 A | 8/2017 |
| CN | 107220533 A | 9/2017 |
| CN | 107545167 A | 1/2018 |
| CN | 107566628 A | 1/2018 |

OTHER PUBLICATIONS

Second Office Action dated Jun. 24, 2020 corresponding to Chinese application No. 201810053649.8.

\* cited by examiner

METHOD AND DEVICE FOR UNLOCKING FINGERPRINT

CROSS-REFERENCE TO RELATED APPLICATIONS

The application claims the priority of Chinese Patent Application No. 201810053649.8, filed on Jan. 19, 2018 in the Chinese Patent Office, the contents of which are incorporated herein by reference in its entirety.

TECHNICAL FIELD

The disclosure relates to a field of display technology, and in particularly, to a method and a device for unlocking a fingerprint.

BACKGROUND

Recently, the design of full-screen display has become the popular trend, which results in that the cancellation of the physical Home button (starting button) integrated in the display region and the existence of the virtual Home button have become an inevitable trend and brings diversified designs of fingerprint unlocking.

SUMMARY

According to an aspect of the disclosure, a method for unlocking a fingerprint is provided, the method may include: controlling a predetermined light-emitting region of a display device to enter a first display mode, upon receipt of external light; controlling the predetermined light-emitting region of the display device to enter a second display mode, when the predetermined light-emitting region of the display device is pressed; and acquiring fingerprint information in the predetermined light-emitting region of the display device after the predetermined light-emitting region enters the second display mode, and determining whether to allow unlocking or not according to the fingerprint information.

In an embodiment, the method may further include: adjusting a display position of the predetermined light-emitting region of the display device according to display time of the display device.

In an embodiment, the display position of the predetermined light-emitting region of the display device is moved by a distance of at least one pixel point according to the display time of the display device.

In an embodiment, the method may further include: controlling at least one of a display color, a display pattern, a display position, display effect, and a display state of the predetermined light-emitting region of the display device according to setting information input by a user.

In an embodiment, the display effect of the predetermined light-emitting region of the display device in the first display mode is controlled according to a first timing; and/or the display effect of the predetermined light-emitting region of the display device in the second display mode is controlled according to a second timing.

In an embodiment, the display effect comprises an alternating light and dark display or a breathing-display in which brightness is continuously brightened or dimmed overtime.

In an embodiment, the predetermined light-emitting region of the display device has a first brightness in the first display mode; and the predetermined light-emitting region of the display device has a second brightness higher than the first brightness in the second display mode.

In an embodiment, the first brightness is lower, so that the step of acquiring fingerprint information of the predetermined light-emitting region is not performed; and the second brightness is higher, so that the step of acquiring fingerprint information of the predetermined light-emitting region is performed.

According to an aspect of the disclosure, a device for unlocking a fingerprint may includes: an ambient light detecting device, configured to send a first signal to a control device upon receipt of external light; a pressure detecting device, configured to send a second signal to the control device when a predetermined light-emitting region of a display device is pressed; the control device, configured to control the predetermined light-emitting region of the display device to enter a first display mode upon receipt of the first signal, and control the predetermined light-emitting region of the display device to enter a second display mode upon receipt of the second signal; and a fingerprint identifying device, configured to acquire fingerprint information in the predetermined light-emitting region of the display device after the predetermined light-emitting region enters the second display mode, determine whether to allow unlocking or not according to the fingerprint information, and send a result of the determination to the control device.

In an embodiment, the ambient light detecting device may include an ambient light sensor provided on a side distal to the predetermined light-emitting region inside the display device.

In an embodiment, the fingerprint identifying device may include: a lens, disposed on a side adjacent to the predetermined light-emitting region inside the display device and corresponding to the predetermined light-emitting region, and configured to send the fingerprint information from the predetermined light-emitting region to a fingerprint identifying unit; and the fingerprint identifying unit, configured to determine whether to allow unlocking or not according to the fingerprint information, and send the result of the determination to the control device.

In an embodiment, the pressure detecting device may include a pressure sensor. The pressure sensor is provided on a side adjacent to the predetermined light-emitting region inside the display device and corresponds to the predetermined light-emitting region.

In an embodiment, the predetermined light-emitting region of the display device has a first brightness in the first display mode; and the predetermined light-emitting region of the display device has a second brightness higher than the first brightness in the second display mode.

In an embodiment, the first brightness is lower, so that the fingerprint identifying device does not acquire the fingerprint information of the predetermined light-emitting region; and the second brightness is higher, so that the fingerprint identifying device acquires the fingerprint information of the predetermined light-emitting region.

In an embodiment, the control device is further configured to adjust a display position of the predetermined light-emitting region of the display device according to display time of the display device.

In an embodiment, the control device is further configured to control the display position of the predetermined light-emitting region of the display device to move by a distance of at least one pixel point according to the display time of the display device.

In an embodiment, the control device is further configured to control at least one of a display color, a display pattern, a display position, display effect, and a display state of the predetermined light-emitting region of the display device according to setting information input by a user.

In an embodiment, the control device is further configured to control the display effect of the predetermined light-emitting region of the display device in the first display mode according to a first timing; and/or the control device is further configured to control the display effect of the predetermined light-emitting region of the display device in the second display mode according to a second timing.

BRIEF DESCRIPTION OF THE DRAWINGS

FIGS. 4-1, 4-2 and 4-3 are diagrams showing changes in brightness of a predetermined light-emitting region over time according to embodiments of the disclosure;

DETAILED DESCRIPTION

In order to enable those skilled in the art to better understand the technical solutions of the present disclosure, a method and a device for unlocking a fingerprint according to the disclosure are described in detail below with reference to the accompanying drawings.

Figure 1:
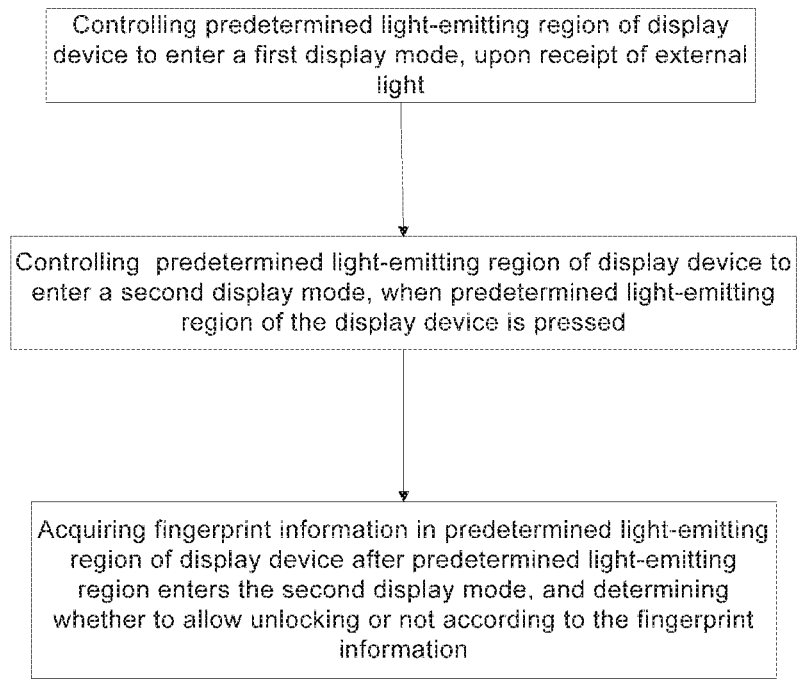
FIG. 1 is a flowchart of a method for unlocking a fingerprint according to an embodiment of the disclosure.
Figure 2:
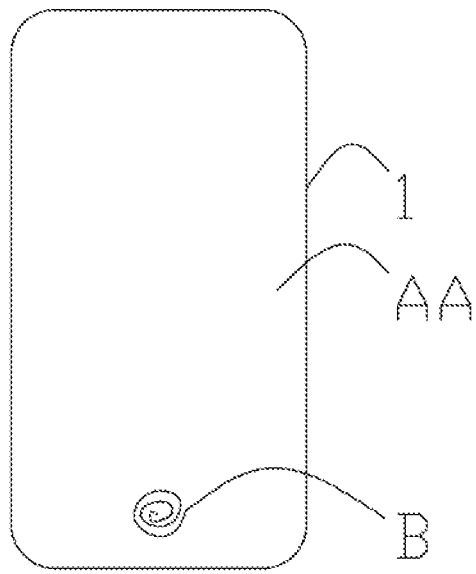
FIG. 2 is a schematic diagram of a screen of a display device according to an embodiment of the disclosure.

FIG. 1 is a flowchart of a method for fingerprint unlocking according to an embodiment of the disclosure. FIG. 2 is a schematic diagram of a screen of a display device according to an embodiment of the disclosure. Referring to FIGS. 1 and 2, the method for unlocking the fingerprint according to the disclosure may include steps 1, 2 and 3.

At step 1, a predetermined light-emitting region of the display device enters a first display mode upon receipt of the external light.

The predetermined light-emitting region serves as virtual Home button and is integrated in a display region of the display device.

In an embodiment, a low brightness (e.g., a first brightness) of the predetermined light-emitting region may be set in a first display mode, as long as a position of the virtual HOME button can be seen by a user, thereby saving power energy. Of course, the user may adjust the first brightness.

At step 2, the predetermined light-emitting region of the display device enters a second display mode, when the predetermined light-emitting region of the display device is pressed (e.g., touched by the user).

Specifically, when the user needs to enter a main screen of the display device 1 (that is, to enter an operation mode), the user may press the predetermined light-emitting region B of the display device 1 so as to enable the predetermined light-emitting region B of the display device 1 to enter the second display mode. A higher brightness (e.g., a second brightness higher than the first brightness) of the predetermined light-emitting region B may be set in the second display mode so as to achieve the brightness required for subsequent acquisition of fingerprint information.

At step 3, the fingerprint information in the predetermined light-emitting region B is acquired after the predetermined light-emitting region enters the second display mode, and whether to allow unlocking or not is determined according to the fingerprint information. If unlocking is allowed, the display device 1 is unlocked and enters the operation mode.

The predetermined light-emitting region B served as the HOME button has a predetermined brightness in the first display mode, so that the user can see or find the position of the HOME button and perform fingerprint unlocking of the full screen display device with the virtual HOME button.

In an embodiment, the first brightness of the predetermined light-emitting region B of the display device 1 in the first display mode is too low to acquire the fingerprint information in the predetermined light-emitting region B. Moreover, the predetermined light-emitting region B of the display device 1 in the second display mode has a higher second brightness that is high enough to perform the step of acquiring the fingerprint information in the predetermined light-emitting region B. As such, an automatic controlling for acquiring fingerprint information can be realized.

In an embodiment, the display position of the predetermined light-emitting region B of the display device 1 is adjusted according to display time of the display device 1, thereby avoiding that the light-emitting devices in the same region are operated all the time, and improving the working life of the light-emitting devices. For example, the predetermined light-emitting region B of the display device 1 is moved by a distance of at least one pixel point according to the display time of the display device 1.

Figure 3:
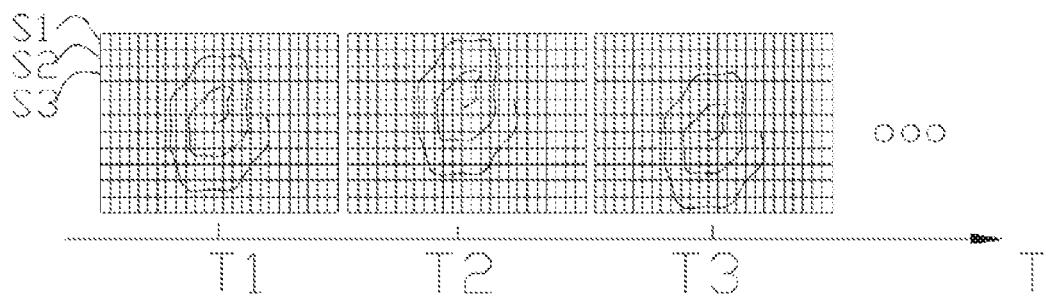
FIG. 3 is a diagram showing a change in position of a predetermined light-emitting region over time according to an embodiment of the disclosure.

FIG. 3 is a diagram showing a change in position of a predetermined light-emitting region over time according to an embodiment of the disclosure. As shown in FIG. 3, the horizontal axis represents the display time T of the display device 1, and the vertical axis represents the position of the predetermined light-emitting region B. At time T1, the predetermined light-emitting region B is located at position S2; at time T2, the predetermined light-emitting region B is moved upward from position S2 to position S1; at time T3, the predetermined light-emitting region B is moved downward from position S1 to position S3. Position S1 and position S2 are two immediately adjacent pixel points, position S2 and position S3 are two immediately adjacent pixel points, and position S1 and position S3 are spaced apart from each other by one pixel point.

In addition, the display color and/or the display pattern (for example, in a heart shape, a cartoon character, etc.) and/or display position, and/or display effect and/or display status of the predetermined light-emitting region B of the display device 1 is controlled according to setting information input by the user, thereby bring more fun and diversity for use. In addition, in practical applications, other settings of the user can also be implemented with software or hardware.

FIGS. 4-1, 4-2 and 4-3 are diagrams showing changes in brightness of a predetermined light-emitting region over time according to embodiments of the disclosure. Three brightnesses are shown in FIGS. 4-1, 4-2 and 4-3, respectively. A breathing-display effect in which the brightness is continuously increased or decreased (i.e., periodically brightened or dimmed) over time is indicated by a curve line in FIG. 4-1 or a fold line in FIG. 4-2. An alternating light and dark display effect in which brightness is changed alternatively over time, for example, alternating light and dark is indicated by a square wave-shaped line in FIG. 4-3. Specifically, the display effect (such as the breathing-display effect) of the predetermined light-emitting region B of the display device 1 in the first display mode is controlled according to a first timing (e.g., a curve line in FIG. 4-1 or a fold line in FIG. 4-2); and/or, the display effect (for example, the alternating light and dark display effect) of the predetermined light-emitting region B of the display device 1 in the second display mode is controlled according to a second timing (i.e., a square wave-shaped line in FIG. 4-3).

The above mentioned display state may include the display of static pictures or dynamic pictures.

According to the fingerprint unlocking method in the embodiment of the disclosure, the predetermined light-emitting region B served as the HOME button has a certain brightness in the first display mode, so that the user can see or find the position of the HOME button and perform fingerprint unlocking of the full screen display device with the virtual HOME button.

Figure 5:
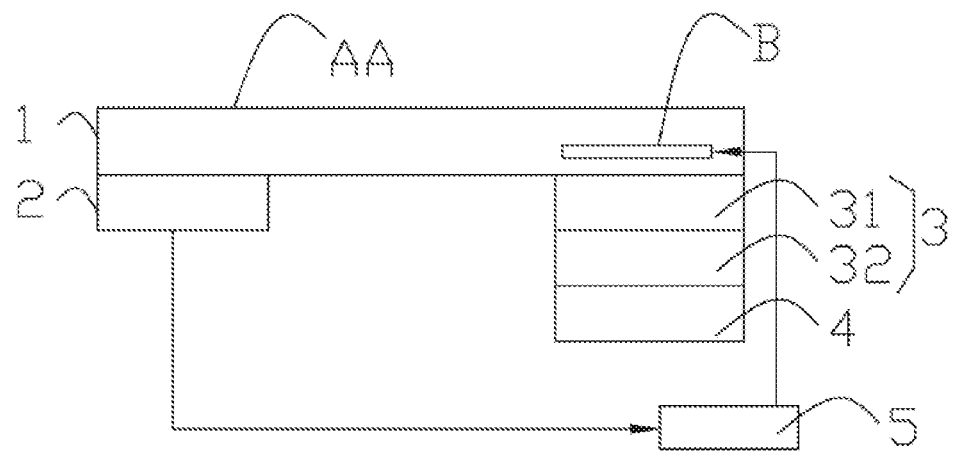
FIG. 5 is a diagram of a device for unlocking a fingerprint in a first display mode according to an embodiment of the disclosure.

FIG. 5 is a diagram of a fingerprint unlocking device in a first display mode according to an embodiment of the disclosure. Referring to FIG. 5, the device for unlocking the fingerprint may include an ambient light detecting device 2, a fingerprint identifying device 3, a pressure detecting device 4 and a control device 4 that are provided on the back of a display panel of a display device. In an embodiment, the ambient light detecting device 2, the fingerprint identifying device 3, the pressure detecting device 4 and the control device 4 are provided inside the display device 1 in an in-cell manner, on-cell manner or add-on manner, and the disclosure is not limited thereto.

The ambient light detecting device may send a first signal to the control device when the external light is received. The pressure detecting device may send a second signal to the control device when the predetermined light-emitting region of the display device is pressed. The control device may control the predetermined light-emitting region of the display device to enter a first display mode when the first signal is receive by the control device, and control the predetermined light-emitting region of the display device to enter a second display mode when the second signal is received by the control device. The fingerprint identifying device may acquire fingerprint information in the predetermined light-emitting region of the display device after the predetermined light-emitting region enters the second display mode, determine whether to allow unlocking or not according to the fingerprint information, and send a result of the determination to the control device. If the unlocking is allowed, the control device 5 is configured to control the display device to be unlocked.

When a display device such as a mobile phone, a tablet, or the like is in a dark environment such as a pocket, a trouser pocket, a backpack, or the like, the display region AA of the display device 1 is in a completely black mode. When the user needs to use the display device 1, the user may put the display device 1 into the external environment in which the external light is received by the ambient light detecting device 2, and then the ambient light detecting device 2 transmits the first signal to the control device 5. The control device 5 may control the predetermined light-emitting region B of the display device 1 to enter the first display mode when the first signal is received by the control device 5. The predetermined light-emitting region B served as the HOME button may have a certain brightness (that is, a first brightness) in the first display mode, so that the user can see or find the specific position of the HOME button, thereby avoiding the problem that the user cannot find the specific position of the HOME button in case of completely black screen, and realizing the fingerprint unlocking of the full screen display device with the virtual HOME button.

Figure 6:
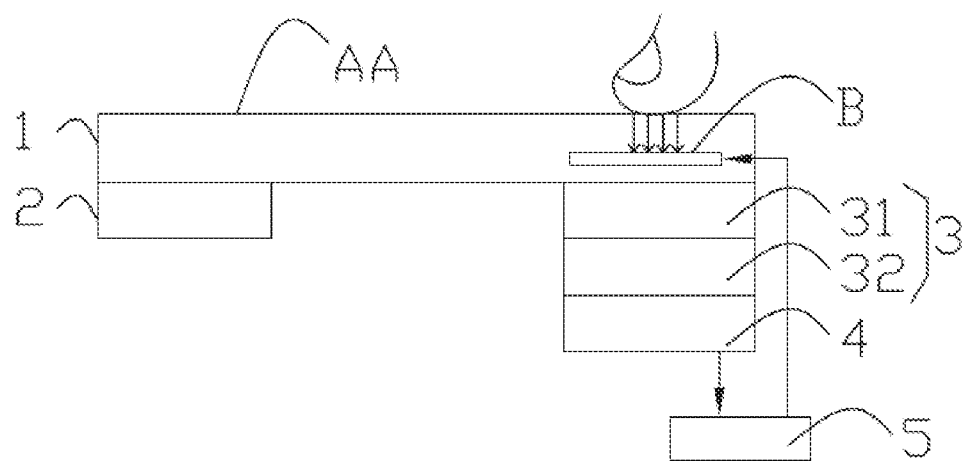
FIG. 6 is a diagram of a device for unlocking a fingerprint in a second display mode according to an embodiment of the disclosure.

FIG. 6 is a diagram of a device for unlocking a fingerprint in a second display mode according to an embodiment of the disclosure. Referring to FIG. 6, when the user needs to enter a main screen of the display device 1 (that is, to enter an operation mode), the user may press the predetermined light-emitting region B of the display device 1, and then the pressure detecting device 4 may transmit the second signal to the control device 5. The control device 5 may control the predetermined light-emitting region B of the display device 1 to enter the second display mode when the second signal is received by the control device 1. In the second display mode, the predetermined light-emitting region B is operated with a higher brightness (i.e., a second brightness or highlight brightness), which can achieve the brightness required for subsequent acquisition of fingerprint information, thereby enabling the function of fingerprint identifying.

The fingerprint identifying device 3 may acquire fingerprint information in the predetermined light-emitting region B of the display device 1 after the predetermined light-emitting region B enters the second display mode, determine whether to allow unlocking or not according to the fingerprint information, and send a result of the determination to the control device 5. If unlocking is allowed, the control device 5 may control the display device 1 to be unlocked.

In the first display mode, the predetermined light-emitting region B of the display device 1 has a brightness that is too low, so that the fingerprint identifying device 3 cannot collect or acquire the fingerprint information of the predetermined light-emitting region B. In the second display mode, the predetermined light-emitting region B of the display device 1 has a higher brightness, so that the fingerprint identifying device 3 can collect or acquire the fingerprint information of the predetermined light-emitting region B. As such, an automatic controlling for acquiring the fingerprint information can be realized.

Specifically, the ambient light detecting device 2 may include an ambient light sensor, and the ambient light sensor is provided inside the display device 1, specifically, provided on a side distal to the predetermined light-emitting region B inside the display device 1.

In an embodiment, the fingerprint identifying device 3 may include a lens and a fingerprint identifying unit. The lens is disposed on a side adjacent to the predetermined light-emitting region B inside the display device 1 and corresponds to the predetermined light-emitting region B, and sends or converges the fingerprint information (the optical information about the fingerprint) in the predetermined light-emitting region B to the fingerprint identifying unit 32. The fingerprint identifying unit 3 may determine whether to allow unlocking or not according to the fingerprint information, and send the result of the determination to the control device 5.

Specifically, the pressure detecting device 4 may include a pressure sensor, and the pressure sensor is provided on a side adjacent to the predetermined light-emitting region B inside the display device 1, corresponds to the predetermined light-emitting region B, and is located on the fingerprint identifying device 3, as shown in FIG. 6.

In conclusion, according to the fingerprint unlocking device provided by the embodiment of the disclosure, the predetermined light-emitting region B served as the HOME button has a certain brightness in the first display mode, so that the user can see or find the position of the HOME button and perform fingerprint unlocking of the full screen display device with the virtual HOME button.

According to the fingerprint unlocking device provided by the embodiments of the disclosure, the control device 5 may adjust the display position of the predetermined light-emitting region B of the display device 1 according to display time of the display device 1, thereby avoiding that the light-emitting devices in the same region are operated all the time, and improving the working life of the light-emitting device. For example, the control device 5 may control the predetermined light-emitting region B of the display device 1 to move by a distance of at least one pixel point according to the display time of the display device 1.

For example, as shown in FIG. 3, the horizontal axis represents the display time T of the display device 1, and the vertical axis represents the position of the predetermined light-emitting region B. At time T1, the predetermined light-emitting region B is located at position S2; at time T2, the predetermined light-emitting region B is moved upward from position S2 to position S1; at time T3, the predetermined light-emitting region B is moved downward from position S1 to position S3. Position S1 and position S2 are two immediately adjacent pixel points, position S2 and position S3 are two immediately adjacent pixel points, and position S1 and position S3 are spaced apart from each other by one pixel point.

Figures 1, 4:
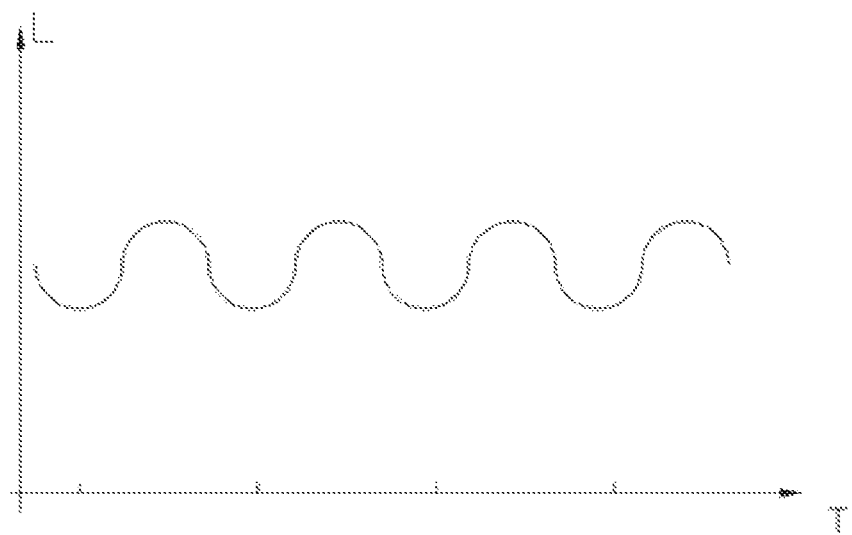
Figures 2, 4:
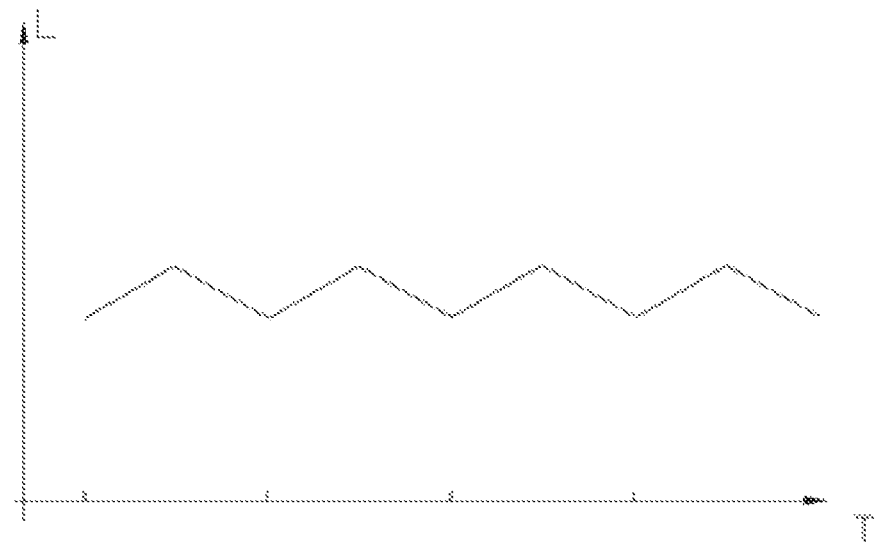
Figures 3, 4:
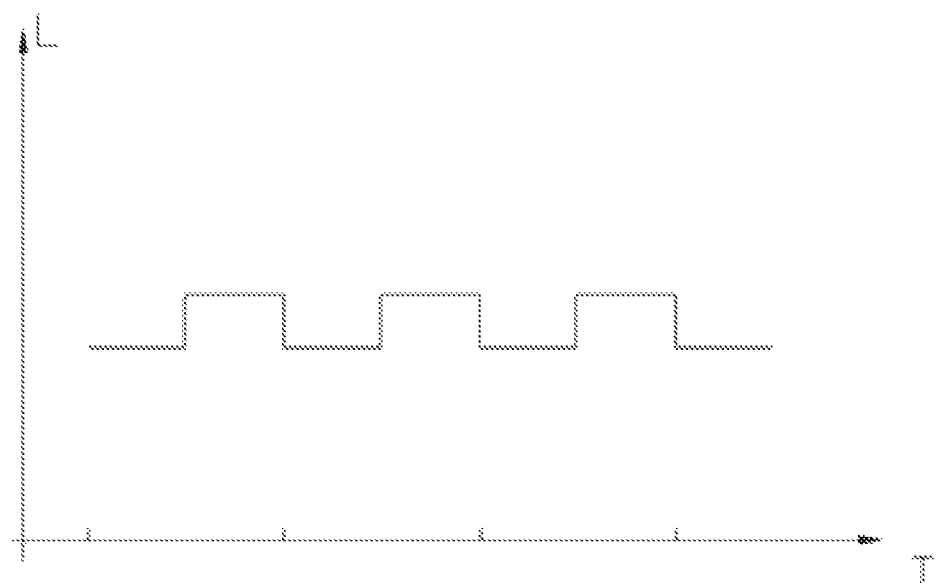

In addition, the control device 5 may control at least one of the display color, the display pattern (for example, in a heart shape, a cartoon character, etc.), display position, display effect and display status of the predetermined light-emitting region B of the display device 1 according to setting information input by the user, thereby bring more fun and diversity for use. In addition, in practical applications, other settings of the user can also be implemented with software or hardware. The display effect described above may include an alternating light and dark display effect or a breathing-display effect. As shown in FIGS. 4-1 and 4-2, the breathing-display effect in which the brightness is continuously increased or decreased (i.e., brightened or dimmed) over time is indicated by a curve line in FIG. 4-1 and a fold line in FIG. 4-2; and an alternating light and dark display effect in which brightness is changed alternatively over time, for example, alternating light and dark is indicated by a square wave-shaped line in FIG. 4-3.

According to the fingerprint unlocking device provided by the embodiments of the disclosure, the control device 5 may control the display effect (such as the breathing-display effect) of the predetermined light-emitting region B of the display device 1 in the first display mode according to a first timing indicated by the curve line or the fold line; and/or, the control device 5 may control the display effect (for example, the alternating light and dark display effect) of the predetermined light-emitting region B of the display device 1 in the second display mode according to a second timing indicated by the square wave-shaped line. The first timing and the second timing are shown in FIGS. 4-1, 4-2 and 4-3.

The above mentioned display state may include the display of static pictures or dynamic pictures.

According to the fingerprint unlocking device in the embodiment of the disclosure, the predetermined light-emitting region B served as the HOME button has a certain brightness in the first display mode, so that the user can see or find the position of the HOME button and perform fingerprint unlocking of the full screen display device with the virtual HOME button.

It should be noted that each of devices such as the control device and the fingerprint identifying device shown in FIGS. 5 and 6 may be implemented by hardware, software, or a combination of hardware and software. In an embodiment, each device may be implemented by an integrated circuit, controller or microprocessor with associated functions. In another embodiment, each device may be implemented by a computer and software stored in a computer memory, wherein the processor of the computer may execute instructions that implement the function of each device.

It should be understood that the above implementations are merely exemplary embodiments for the purpose of illustrating the principles of the present disclosure, and the present disclosure is not limited thereto. It should be apparent to those skilled in the art that various changes and modifications can be made without departing from the spirit and spirit of the present disclosure, which are also to be regarded as within the scope of the present disclosure.

What is claimed is:

1. A fingerprint unlocking method for a display device, the display device comprising a display region in which a predetermined light-emitting region is integrated therein, the fingerprint unlocking method comprising:
controlling the predetermined light-emitting region of the display device to enter a first display mode, upon receipt of external light,
controlling the predetermined light-emitting region of the display device to enter a second display mode, when the predetermined light-emitting region of the display device is pressed; and
acquiring fingerprint information in the predetermined light-emitting region of the display device after the predetermined light-emitting region enters the second display mode, and determining whether to allow unlocking or not according to the fingerprint information, wherein
in the first display mode, the predetermined light-emitting region of the display device has low first brightness such that the step of acquiring fingerprint information at the predetermined light-emitting region is not performed, and the predetermined light-emitting region is different in brightness from a light-emitting region of the display region except the predetermined light-emitting region;
in the second display mode, the predetermined light-emitting region of the display device has higher second brightness than the first brightness, such that the step of acquiring fingerprint information at the predetermined light-emitting region is performed;
at a first time, the predetermined light-emitting region is at a first position; at a second time, the predetermined light-emitting region is at a second position; and at a third time, the predetermined light-emitting region is at a third position; the first position, the second position, and the third position being different from each other, and
the fingerprint unlocking method further comprises:
in the first display mode, continuously increasing or decreasing the brightness of the predetermined light-emitting region of the display device over time according to a curve line or a fold line; and
in the second display mode, controlling the brightness of the predetermined light-emitting region of the display device over time according to a square wave-shaped line having the same peak values.

2. The fingerprint unlocking method according to claim 1, wherein the display position of the predetermined light-emitting region of the display device is moved by a distance of at least one pixel point according to the display time of the display device.

3. The fingerprint unlocking method according to claim 1, further comprising: controlling at least one of a display color, a display pattern, a display position, display effect, and a display state of the predetermined light-emitting region of the display device according to setting information input by a user.

4. The fingerprint unlocking method according to claim 3, wherein the display effect comprises an alternating light and dark display or a breathing-display in which brightness is continuously brightened or dimmed overtime.

5. A fingerprint unlocking device for a display device, the display device comprising a display region in which a predetermined light-emitting region is integrated therein, the fingerprint unlocking device comprising:
an ambient light detecting device, configured to send a first signal to a control device upon receipt of external light;
a pressure detecting device, configured to send a second signal to the control device when the predetermined light-emitting region of the display device is pressed;
the control device, configured to control the predetermined light-emitting region of the display device to enter a first display mode upon receipt of the first signal, and control the predetermined light-emitting region of the display device to enter a second display mode upon receipt of the second signal; and
a fingerprint identifying device, configured to acquire fingerprint information in the predetermined light-emitting region of the display device after the predetermined light-emitting region enters the second display mode, determine whether to allow unlocking or not according to the fingerprint information, and send a result of the determination to the control device, wherein
in the first display mode, the predetermined light-emitting region of the display device has low first brightness such that the fingerprint identifying device does not acquire the fingerprint information at the predetermined light-emitting region, and the predetermined light-emitting region is different in brightness from a light-emitting region of the display region except the predetermined light-emitting region;
in the second display mode, the predetermined light-emitting region of the display device has higher second brightness than the first brightness, such that the fingerprint identifying device acquires the fingerprint information at the predetermined light-emitting region;
at a first time, the predetermined light-emitting region is at a first position; at a second time, the predetermined light-emitting region is at a second position; and at a third time, the predetermined light-emitting region is at a third position; the first position, the second position, and the third position being different from each other, and the control device is further configured to:
in the first display mode, continuously increase or decrease the brightness of the predetermined light-emitting region of the display device over time according to a curve line or a fold line; and
in the second display mode, control the brightness of the predetermined light-emitting region of the display device over time according to a square wave-shaped line having the same peak values.

6. The fingerprint unlocking device according to claim 5, wherein
the ambient light detecting device comprises an ambient light sensor provided on a side distal to the predetermined light-emitting region inside the display device.

7. The fingerprint unlocking device according to claim 5, wherein
the fingerprint identifying device comprises:
a lens, disposed on a side adjacent to the predetermined light-emitting region inside the display device and corresponding to the predetermined light-emitting region, and configured to send the fingerprint information from the predetermined light-emitting region to a fingerprint identifying unit; and
the fingerprint identifying unit, configured to determine whether to allow unlocking or not according to the fingerprint information, and send the result of the determination to the control device.

8. The fingerprint unlocking device according to claim 5, wherein
the pressure detecting device comprises a pressure sensor, and
the pressure sensor is provided on a side adjacent to the predetermined light-emitting region inside the display device and corresponds to the predetermined light-emitting region.

9. The fingerprint unlocking device according to claim 5, wherein
the control device is further configured to control the display position of the predetermined light-emitting region of the display device to move by a distance of at least one pixel point according to the display time of the display device.

10. The fingerprint unlocking device according to claim 5, wherein
the control device is further configured to control at least one of a display color, a display pattern, a display position, display effect, and a display state of the predetermined light-emitting region of the display device according to setting information input by a user.

* * * * *